Patented May 24, 1949

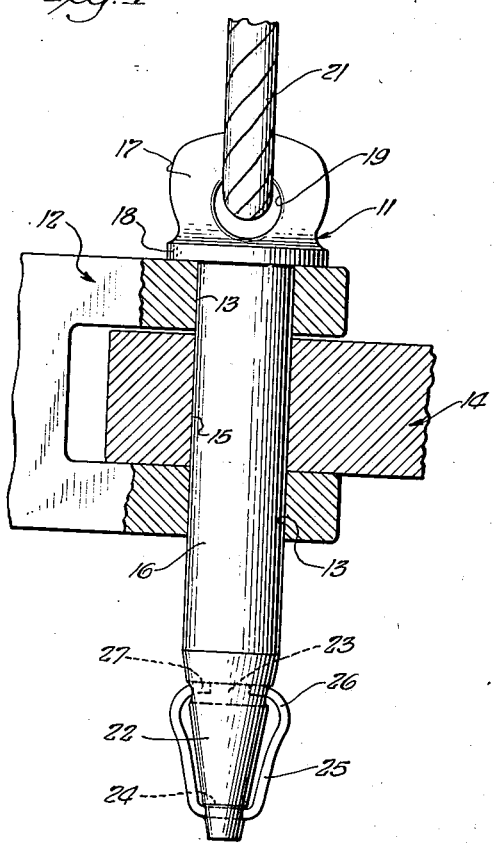
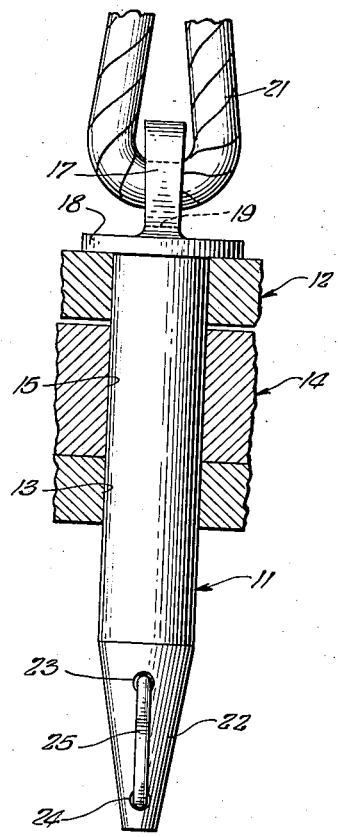
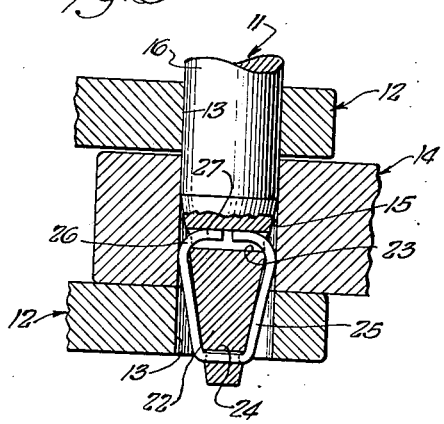

2,471,175

UNITED STATES PATENT OFFICE 2,471,175

CLEVIS PIN

Irl I. Tubbs, Mount Vernon, Iowa, assignor, by mesne assignments, to Ailee H. McIntyre, Cedar Rapids, Iowa, as trustee, and her successor trustees Application April 19, 1946, Serial No. 663,463

11 Claims. (Cl. 278—65)

This invention relates in general to hitches for tractor and trailer vehicles, and more particularly to a novel clevis or coupling pin for use in connecting such vehicles, or any other two members or structural parts, to transmit forces to one that are applied to the other.

A principal object of the invention is the provision of a clevis pin of extremely simple construction which embodies means for effectively preventing accidental removal of the pin during normal use, but which permits ready and easy voluntary removal thereof whenever desired.

Another important object is to provide such releasable clevis pin retaining means which will enable removal of the pin from a point spaced at any desired distance therefrom, as from the seat of a tractor when the pin is used to couple the tractor and some trailer vehicle.

A further important object of the invention is the provision of such a clevis or coupling pin which will not accumulate dirt or other foreign material so as to be rendered incapable of operation whenever it is desired that the pin be removed from the parts connected thereby.

Numerous other objects and advantages of the invention will be apparent as it is better understood from the following description, which, when taken in connection with the accompanying drawings, discloses a preferred embodiment thereof.

In the drawings,

Figure 1 is a side elevational view of a pin embodying the features of the instant invention in connecting position, with parts of the hitch members connected thereby shown in section;

Fig. 2 is a view similar to Fig. 1 with the novel pin axially displaced ninety degrees from the latter; and Fig. 3 is a fragmentary view partially in cross-section and shows the pin being removed from the hitch members.

Referring more particularly to the drawings, reference numeral 11 indicates in general a clevis or coupling pin embodying the features of the instant invention and adapted to connect any desired members or parts having suitable apertures therethrough to transmit to one forces that are applied to the other. A U-shaped clevis 12 having aligned apertures 13 through the opposed arms thereof is illustrated as one of such members, which may be a hitch or drawn member on a trailer, farm machine, or the like. The other of such members is shown as a hitch member or draft bar 14 of a tractor, or the like, which is adapted to be inserted between the opposed arms of the clevis 12 and has an aperture 15 extending therethrough of substantially the same diameter as, and alignable with, the apertures 13.

The pin 11 comprises an elongated main body portion 16, shown herein as cylindrical, although it will be appreciated that the cross sectional shape thereof may be square, hexagonal, or of any other desired configuration, with the apertures 13 and 15 preferably having a similar configuration. The body portion 16 is provided at one end with a head or handle portion 17, preferably formed integrally therewith, which includes an external flange 18 larger than the apertures 13, and a transversely disposed aperture 19. A rope or cable 21 may be passed through the aperture 19 and extended therefrom over suitable guide means (not shown) to a remote point, such as adjacent the driver's seat on the tractor, to provide means operable in well-known manner for imparting voluntary disconnecting movement to the pin 11 from a place distant from the pin.

At the end opposite the head portion 17, the body portion 16 of the pin 11 is gradually reduced in cross section to provide a tapered end portion 22 having a pair of transverse apertures 23 and 24 extending therethrough which are spaced from each other and disposed at certain points along the tapered surface of this end portion for a purpose to be described in detail hereinafter. A retainer or keeper in the form of a spring clip 25 is mounted on the tapered end portion 22 of the pin 11 by having the central portion thereof extending through the transverse aperture 24 with its two ends bent or otherwise formed upwardly to provide legs extending adjacent the sides of the tapered portion. Adjacent their upper ends, these legs of the clip 25 are formed or bent outwardly and then inwardly to provide curved portions 26 normally extending laterally beyond the sides of the main body portion 16, as shown in Fig. 1. Each of the legs of the clip 25 terminates in a radially disposed end 27 extending into the associated end of the transverse aperture 23.

The transverse aperture 24 preferably is disposed adjacent the outer end of the tapered end portion 22 to provide an end guide portion therebelow, but this aperture may be omitted, if desired, and the central portion of the clip 25 welded, soldered, or otherwise secured in any suitable manner to the pin across the end surface thereof. In either case, the transverse aperture 23 is disposed at such a point that the legs of the clip 25 are compressible radially inwardly toward the outer surface of the tapered end portion 22, as shown in Fig. 3, to bring the outermost portions of the clip within the extension of the confines of the sides of the main body portion 16. The uppermost position, viewing Fig. 3, in which the aperture 23 may be placed in order to accomplish this result, of course, will depend upon the diameter of the wire used to make the clip 25 and the pitch or degree of slope of the tapered end portion 22. The apertures 23 and 24 are made as small in diameter as is consistent with admitting the clip 25, in the case of the lower one, and with permitting complete compression of the clip, as shown in Fig. 3, in the case of the upper one, so as not to provide any spaces within which dirt and other foreign material might lodge. The possibility of the clip 25 being rendered inoperative by the accumulation of dirt or other foreign material thus is minimized.

As will be appreciated from a consideration of Fig. 1, the clip 25 is so shaped that, even in its normal or expanded position, the lower parts of its legs are disposed within the extension of the confines of the sides of the main body portion 16 of the pin 11. Consequently, the tapered end of the pin may readily be inserted into one of the apertures 13 of the clevis 12 and, with the draft member 14 positioned relative to the latter as shown in the drawings, pressure on the head portion 17 will compress the clip 25 to its position of Fig. 3 to permit movement of the pin to its member connecting position of Figs. 1 and 2. The clip 25 will then function to retain the pin 11 in this position, and will effectively prevent accidental removal thereof.

Whenever it is desired to disengage the members 12 and 14 by removing the pin 11 therefrom, as will be understood by reference to Fig. 1, it is necessary only to impart a voluntary and forceful upward movement to the pin. The main body portion 16 of the pin is sufficiently long to provide a considerable space between the retaining clip 25 and the lowermost of the parts connected by the pin, shown in Fig. 1 as the lower arm of the member 12. Sufficient free upward movement of the pin 11 relative to the members 12 and 14 thus is permitted, prior to the clip 25 contacting the lower surface of that arm, to enable enough momentum to be imparted intentionally to the pin to compress the clip 25 to its release position of Fig. 3 by a camming action of the lower surface of the connected members against the curved portions 26 of the legs of the clip. This vertical movement of the pin 11 may be imparted thereto, if desired, through the agency of the rope 21. The spacing provided between the curved portions 26 of the retaining clip and the lowermost surface of the connected members, as shown in Fig. 1, thus eliminates the necessity of employing a claw-bar, or the like, under the flange 18 of the head 17 and of applying radially directed compressive force to the retaining clip 25 by some additional means, and enables ready and easy intentional removal of the clevis pin from a point spaced at any desired distance therefrom.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device of the class described, comprising a draft member, a drawn member, said members having alignable apertures therein, and a clevis pin for connecting said members, comprising a main body portion engageable in said apertures, a head portion at one end of said body portion for positively limiting movement of the pin in one direction relative to said members, and a spring clip secured at its outer end to the other end of said body portion and having a curved portion at its inner end spaced from said members when said head portion is in contact therewith for preventing accidental withdrawal movement of said pin in the opposite direction relative to said members, said clip being compressed by contact of said curved portion with said members during intentional withdrawal movement of said pin to enable complete voluntary removal thereof from said members.

2. A device of the class described, comprising a draft member, a drawn member, said members having alignable apertures therein, a clevis pin for connecting said members, comprising a main body portion engageable in said apertures, a head portion at one end of said body portion for positively limiting movement of the pin in one direction relative to said members, and a spring clip secured at its outer end to the other end of said body portion and having a curved portion at its inner end spaced from said members when said head portion is in contact therewith for preventing accidental withdrawal movement of said pin in the opposite direction relative to said members, said clip being compressed by contact of said curved portion with said members during intentional withdrawal movement of said pin to enable complete voluntary removal thereof from said members, and means connected to said head portion and operable from a place remote from said members to impart intentional withdrawal movement to said pin.

3. A clevis pin comprising a main body portion, a head at one end of said body portion, the other end of said body portion being progressively reduced in cross section to provide a tapered end portion having a transverse aperture extending therethrough, and a resilient retaining clip secured at its center to said tapered end portion and having legs extending along said tapered end toward said head and laterally beyond the sides of said body portion and terminating in radially disposed ends extending into said transverse aperture, said aperture being disposed at such a point on the tapered surface that radial compression of said legs toward said tapered surface will bring the outermost portions thereof within the extension of the confines of the sides of said main body portion.

4. A clevis pin comprising a main body portion, a head portion at one end of said body portion, a tapered portion at the other end of said body portion, having a transverse aperture therein, and a resilient retaining clip secured centrally thereof to said tapered portion and having legs extending along said tapered portion toward said head portion and laterally beyond the sides of said body portion and terminating in radially disposed ends extending into said transverse aperture, said aperture enabling radial compression of said legs toward the tapered surface to bring the outermost portions thereof within the extension of the confines of the sides of said main body portion, said legs being curved adjacent their inwardly directed ends to enable compression thereof upon impact against any stationary surface disposed radially relative thereto.

5. A clevis pin comprising an elongated main body portion, a head at one end and extending laterally beyond the sides of said body portion, the other end of said body portion terminating in a decreasingly tapered portion having a pair of longitudinally spaced, radially disposed apertures extending therethrough, and a resilient retaining clip having its center portion disposed in and substantially filling the outer of said apertures and having legs extending therefrom along said tapered portion and laterally beyond the sides of said main body portion and terminating in radially disposed ends extending into the inner of said apertures, said inner aperture being disposed at such a position in said tapered portion that radial compression of said legs may bring the outermost portions thereof within the extensions of the confines of the sides of said main body portion.

6. In combination with a draft member and a drawn member having vertically disposed apertures extending therethrough, a coupling pin insertable through said apertures for connecting said members, comprising a main body portion engageable by said members, a head portion for engaging the upper one of said members to limit downward movement of the pin, and a spring retaining clip mounted adjacent the lower end of said body portion and normally extending beyond the side walls of said apertures to prevent accidental removal of said pin from said members during connecting use thereof, said main body portion extending below the lower one of said members to space said spring clip therefrom so that the momentum resulting from voluntary upward movement imparted to said pin will assist in the compression of said spring clip by the lower one of said members within the confines of said apertures to enable desired removal of said pin.

7. In combination with a draft member and a drawn member having vertically disposed apertures extending therethrough, a coupling pin insertable through said apertures for connecting said members, comprising a main body portion engageable by said members, a head portion for engaging the upper one of said members to limit downward movement of the pin, and a spring retaining clip mounted adjacent the lower end of said body portion and normally extending beyond the side walls of said apertures to prevent accidental removal of said pin from said members during connecting use thereof, said main body portion extending below the lower one of said members to space said spring clip therefrom so that the momentum resulting from voluntary upward movement imparted to said pin will assist in the compression of said spring clip by the lower one of said members within the confines of said apertures to enable desired removal of said pin, and means connected to said head portion and operable from a place remote from said members to impart upward movement to said pin to remove the same from said members.

8. A clevis pin comprising a main body portion having a transverse aperture therein adjacent one end, an enlarged head at the other end of said body portion, and a resilient retaining clip secured to said body portion and having a leg extending longitudinally of the latter and terminating in a free end extending laterally into said transverse aperture, said leg normally extending outwardly beyond the adjacent side surface of said main body portion and being compressible by inward movement of the free end thereof to dispose said clip interiorly of said side surface, and said free end displacing any accumulated foreign material from said aperture upon such compression of said clip.

9. A clevis pin comprising a main body portion having a transverse aperture extending therethrough adjacent one end, an enlarged head at the other end of said body portion, and a resilient retaining clip secured at its center to said body portion and having legs extending longitudinally of the latter and spreading outwardly therefrom and terminating in free ends extending laterally into said transverse aperture, said legs normally extending outwardly beyond the sides of said main body portion and being compressible by inward movement of the free ends thereof to dispose said clip interiorly of the sides of said main body portion, and said free ends displacing foreign material accumulated in said aperture upon such compression of said clip.

10. In a hitching device having spaced members with oppositely aligned apertures extending therethrough, a coupling pin for placement in said apertures, comprising a main body portion, a head portion at one end of said body portion for positively limiting movement of the pin in one direction relative to the first of said members, and a spring clip mounted on the other end of said body portion in spaced relation to the outer surface of the second one of said members, when said head portion is in contact with the opposite outer surface of said first one of said members, for preventing accidental displacement of the pin from said members in the opposite direction, said clip being so shaped that the momentum imparted to said pin by a quick intentional withdrawal movement thereof from said apertures in said opposite direction will cause inward compression of said clip by the resulting striking of the clip against said outer surface of said second member to enable passage of the clip through said apertures, and said surface-striking end of said clip being so spaced relative to said head portion as to provide said spacing thereof from said second member so as to permit limited free withdrawal movement of the pin relative to said members to enable the necessary momentum to be imparted to said pin.

11. In a hitching device having spaced members with oppositely aligned apertures extending therethrough, a coupling pin, comprising a main body portion for engagement with said members by placement in said apertures, a handle portion at the upper end of said main body portion to facilitate insertion of said pin in and withdrawal from said apertures, said handle portion being of greater cross-sectional area than said apertures to positively limit downward movement of said pin by engagement of the upper one of said members, a lower end portion at the other end of said main body portion extending below the lower one of said members when said handle portion is in contact with said upper member, and a spring clip mounted on said lower end portion in spaced relation to said lower member and normally extending laterally from said lower end portion to prevent accidental removal of said pin from said apertures, such spacing of said clip from said lower member permitting free upward movement of said pin through a limited distance relative to said members upon intentional withdrawal movement of said handle portion, and said clip being so shaped that the resulting momentum imparted to said pin by a quick intentional withdrawal movement will cause compression of said clip by said members to enable passage of the clip through said apertures to permit complete withdrawal of said pin therefrom.

IRL I. TUBBS.

REFERENCES CITED

The following references are of record in the file of this patent:

UNITED STATES PATENTS

| Number | Name | Date |
|---|---|---|
| 105,104 | McCargar | July 5, 1870 |
| 349,004 | Renshaw et al. | Sept. 14, 1886 |